United States Patent [19]
Pauley

[11] Patent Number: 5,427,151
[45] Date of Patent: Jun. 27, 1995

[54] PRESSURE REGULATING CHEMICAL INJECTOR VALVE

[75] Inventor: Stephen J. Pauley, Palm Harbor, Fla.

[73] Assignee: Simpson Cleaning Systems, Inc., Clearwater, Fla.

[21] Appl. No.: 245,991

[22] Filed: May 18, 1994

[51] Int. Cl.$^6$ ............................................. B01F 5/04
[52] U.S. Cl. .................................. 137/895; 137/505.25; 417/189
[58] Field of Search ..................... 137/895, 505.25; 417/189

[56] References Cited

U.S. PATENT DOCUMENTS

| | | | |
|---|---|---|---|
| 3,473,481 | 10/1969 | Brane | 137/895 X |
| 3,491,948 | 1/1970 | Alexander | 137/895 X |
| 3,890,999 | 6/1975 | Moskow | 137/505.25 |

*Primary Examiner*—Robert G. Nilson
*Attorney, Agent, or Firm*—Joseph C. Mason, Jr.; Ronald E. Smith

[57] ABSTRACT

A chemical injector valve connected to a source of water under pressure harnesses the venturi effect to entrain liquid chemicals into a water stream and employs a variable size pressure chamber to ensure that the flow rate and quantity of chemicals entrained remains constant even when the pressure of water entering the valve varies widely. An increase in incoming water pressure causes expansion of the variable size pressure chamber and a decrease in incoming water pressure causes contraction of the variable size pressure chamber. A slidably mounted piston is biased toward the variable size pressure chamber so that the size of the pressure chamber does not increase unless the accumulation of water in the chamber exceeds the bias acting on the piston. When the bias is exceeded, a shank of the piston moves toward a piston stop and the flow of water into the valve is throttled. When the bias is not exceeded, the shank of the piston moves away from the piston stop, the size of the pressure chamber is decreased, and the flow rate of water into the pressure chamber is increased. An entrainment chamber of fixed size is in open fluid communication with the variable size pressure chamber and a venturi chamber is in open fluid communication with the entrainment chamber.

6 Claims, 5 Drawing Sheets

PRESSURE REGULATING CHEMICAL INJECTOR VALVE

BACKGROUND OF THE INVENTION

1. Field of the Invention

This invention relates, generally, to pressure regulating valves. More particularly, it relates to a pressure regulating valve that harnesses the venturi effect to inject a controlled amount of a liquid chemical into a water stream.

2. Description of the Prior Art

Many applications call for the injection of a chemical in liquid form into a stream of water; the water serves to dilute and carry the chemical into a machine such as a pressure washer, into a container, or onto a surface undergoing treatment.

A typical venturi effect chemical applicator device includes a container having therewithin the liquid chemical to be applied, said container being attached to the end of a water-carrying hose in depending relation thereto, just upstream of a nozzle. A tube is positioned such that its upper end is in fluid communication with the water exiting the hose and its lower end is submerged in the liquid chemical within the container. As water exits the nozzle, it flows past the open upper end of the tube and creates a venturi effect that draws liquid chemicals in the container through the tube and into the water stream exiting the nozzle. Obviously, this well-known, crude construction has few control features. About the only control feature worth mentioning is the ability to roughly control the flow rate of chemicals by adjusting the flow rate of water through the hose.

In commercial applications, there is a need for a device that has a much higher level of control. Adjusting the water flow rate through a hose fails to provide the needed amount of control because water pressure may vary from hour to hour and from minute to minute. Thus, a control device that sets water flow rate at a rate that was acceptable at one moment will not be set properly the next moment if the water pressure changes. What is needed, then, is a control means that injects a predetermined amount of liquid chemicals into a water stream independent of the pressure on the water stream, at a preselected flow rate of water through the nozzle.

One solution to the problem is to provide an injector with a plurality of orifices. For example, U.S. Pat. No. 4,738,541 to Weber discloses an injector having four orifices of differing dimensions. On a low water pressure day, a first orifice is selected as the orifice connected to the chemical container. On a high water pressure day, the last orifice is selected, and the other two orifices are selected on days of intermediate pressure. Obviously, if the water pressure changes while the device is in use, such use must be discontinued and another orifice must be selected.

The ideal device would include a single orifice for a particular flow rate so that those using the device would not have to decide which one to use and would not need to make another selection upon a change in water pressure. The ideal, single orifice device would regulate the flow rate of water entering the device so that instantaneous fluctuations in flow rates would not affect the injection of chemicals into the water stream at the exit end of the device, i.e., the device would operate independently of water pressure fluctuations.

However, when the prior art is viewed as a whole at the time the present invention was made, it was not obvious to those of ordinary skill in this art how such an ideal device could be provided.

SUMMARY OF THE INVENTION

The longstanding but heretofore unfulfilled need for a pressure regulating chemical injector valve that operates independently of instantaneous variations in water pressure is now provided in the form of a device having a single orifice and a servomechanism that regulates the flow rate of water passing therethrough.

An adaptor at the trailing, i.e., water entry end of the device, interconnects the novel nozzle or valve assembly to a hose or other conduit carrying water or other carrier liquid. The adaptor defines a water-entry conduit that is throttled when a piston is displaced toward a piston stop. When the piston is remote from the piston stop, water entry into the nozzle is substantially unimpeded; when the piston slides toward the piston stop, water flow is restricted.

The instantaneous position of the piston is determined by the instantaneous back pressure appearing on the leading face of said piston. A bias means urges the piston away from the piston stop so that when the system is in repose, the flow rate water entering the adapter is at a maximum. As the back pressure increases, the piston is driven toward the piston stop and water flow into the apparatus is restricted.

The instantaneous pressure appearing on the leading face of the piston is determined by the size of a restriction formed in a primary orifice member positioned near the leading or discharge end of the device. A variable size pressure chamber is disposed between said primary orifice and the leading face of the piston so that water unable to flow through the restriction immediately upon arrival at said restriction accumulates temporarily within the pressure chamber. As water accumulates in said pressure chamber, the pressure in said chamber increases until the bias of the piston bias means is overcome, thereby displacing the piston towards the piston stop and thereby restricting water flow into the nozzle. The size of the pressure chamber increases as the piston moves toward the piston stop, and such piston movement throttles the incoming flow of water as aforesaid, thereby tending to stop the increase in size of the pressure chamber. Thus, the sizing of the orifice, the strength of the bias means, and other physical parameters of the system, such as resistance to piston travel caused by friction, determines its sensitivity to changes in incoming water pressure. It should be understood, then, that the system acts as a servomechanism in its instantaneous response to changes in pressure of the incoming water, i.e., an increase in water pressure causes water to enter the pressure chamber at a faster rate and that causes the piston to move toward the piston stop, decreasing the flow rate of water into the pressure chamber. Conversely, a decrease in water pressure causes water to enter the pressure chamber at a slower rate and that causes the piston to move away from the piston stop under the influence of the bias means, and such movement increases the flow rate of water into the pressure chamber. Thus, the pressure within the pressure chamber remains substantially constant.

A venturi chamber is positioned downstream of the primary orifice member, i.e., at the leading end of the novel device, and an entrainment chamber is positioned in open fluid communication with the discharge end of the primary orifice member and the trailing or entrance end of the venturi chamber. A normally closed check valve is positioned in fluid communication with the entrainment chamber, and a checkvalve bias means holds the checkvalve into a normally closed position. When the suction created by the venturi effect overcomes the bias created by the checkvalve bias means, the check valve is opened and the chemical is drawn into the stream of water or other liquid flowing into the venturi chamber. Significantly, the suction created by the venturi effect is always the same, independent of incoming water pressure, because the entrainment chamber is maintained at a constant pressure by the servomechanism that maintains the flow of water through the primary orifice at a substantially constant rate. Thus, the amount of chemicals injected into the water stream also maintained at a substantially constant rate, independent of changes in the instantaneous pressure of water entering the adaptor at the trailing end of the novel device.

The amount of chemicals may also be metered with an adjustable valve.

Accordingly, the invention should now be understood to include a nozzle or valve having a main body, an adaptor for connecting a source of water or other suitable carrier liquid under pressure to a trailing end of said nozzle main body, a venturi chamber formed in a leading end of said nozzle main body, an entraining chamber formed in said nozzle main body in fluid communication with said venturi chamber, upstream thereof, an orifice member, said orifice member having a restriction means formed therein, and said restriction means being in open fluid communication with said entraining chamber, a variable size pressure chamber disposed upstream of said orifice member and said variable size pressure chamber being in fluid communication with said restriction means, a piston disposed upstream of said variable size pressure chamber and having a piston head with a leading face in open communication with said variable size pressure chamber, said piston having an elongate shank, a piston bore having a predetermined diameter being formed in said piston head and said piston shank, a bias means for urging said piston and hence said piston face toward said variable size pressure chamber, a piston stop positioned upstream of said piston, said piston stop disposed in a piston stop chamber and being mounted against movement, said piston stop chamber having a breadth greater than a breadth of said piston stop so that water flowing through said nozzle main body may flow around said piston stop, said piston shank throttling the flow of water around said piston stop when said piston is displaced by expansion of said variable size pressure chamber, whereby the pressure of water in said entraining chamber remains substantially constant independent of the pressure of water entering said nozzle main body, a valve member disposed in orthogonal relation to said nozzle main body in selective fluid communication with said entraining chamber, said valve member including a checkvalve and a checkvalve bias means of predetermined strength for positioning said checkvalve in a normally closed configuration, and said valve member being in fluid communication with a source of liquid chemicals, whereby flow of liquid fluid through said entraining chamber entrains said liquid chemicals at a substantially constant flow rate into a stream of liquid fluid flowing through said entraining chamber.

Thus it is understood that the primary object of this invention is to provide a venturi effect pressure regulating chemical injector valve that delivers a constant flow rate and that operates independently of instantaneous changes in incoming water pressure.

These and other important objects, features and advantages of the invention will become apparent as this description proceeds.

The invention accordingly comprises the features of construction, combination of elements and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawing, in which.

DETAILED DESCRIPTION OF THE PREFERRED EMBODIMENT

Figure 1:
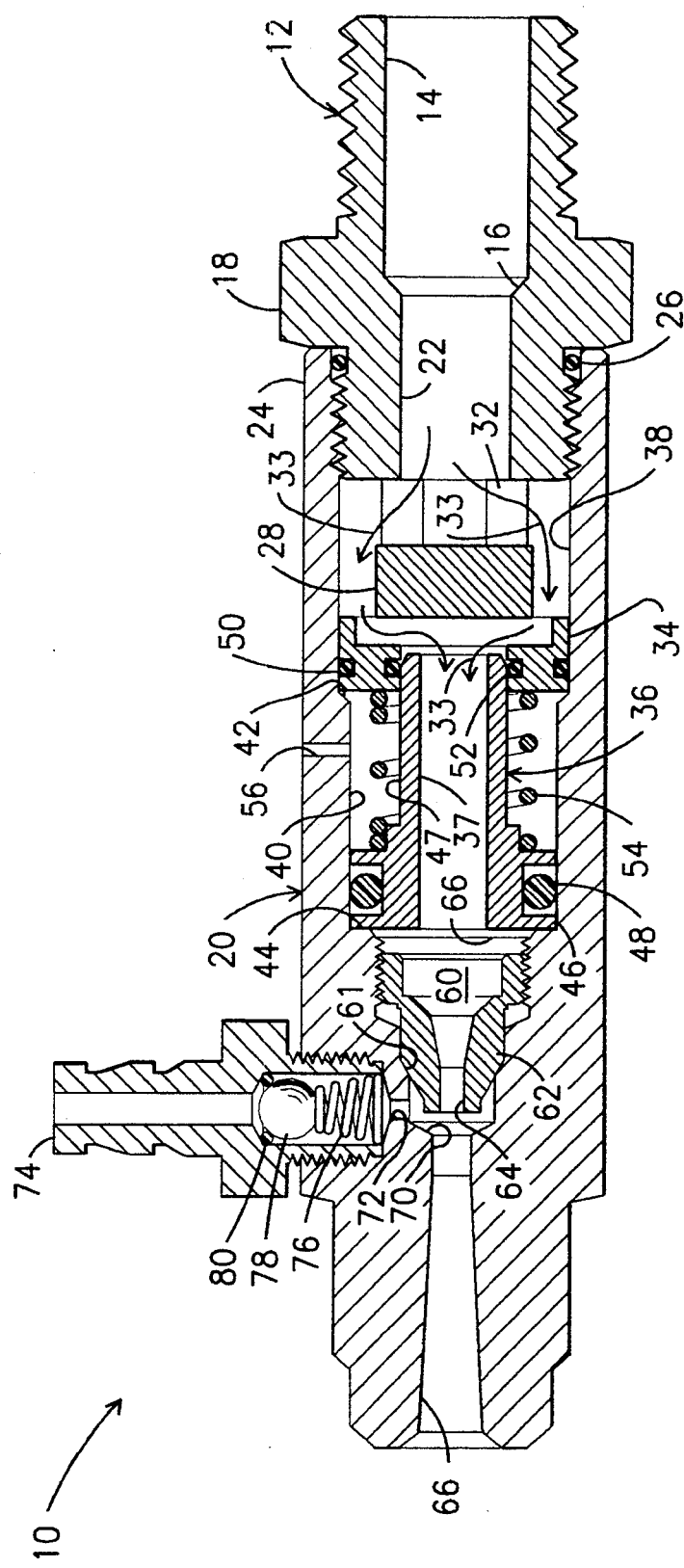
FIG. 1 is a longitudinal sectional view of an exemplary embodiment of the invention in repose.

Referring now to the drawing, it will there be seen that an illustrative embodiment of the invention is denoted by the reference numeral 10 as a whole.

Nozzle or valve 10 includes adapter 12, at its trailing end, having bore 14 formed therein; an annular step 16 reduces the diameter of bore 14 and provides a stop for a hose or other conduit inserted into bore 14. An annular, radially outwardly extending flange 18 limits the depth of insertion of adapter 12 into the main body 20 of nozzle 10. Thus, the leading end 22 of adapter 12 is slidably received within the trailing end 24 of nozzle main body 20; an annular gasket 26 provides a seal. The leading end 22 of adapter 12 is press fit, screw threadedly engaged, or otherwise secured into the trailing end 24 of nozzle main body 20.

Piston stop 28 is square in configuration and is mounted in piston stop chamber 38 so that it cannot move. Spacer legs 32, formed integrally with adapter 12, abut piston stop 28 when said adapter 12 is fully seated as depicted in FIG. 1. The size of piston stop chamber 38 exceeds the size of the piston stop so that incoming water may flow around said piston stop as will be set forth in more particularity hereinafter.

Piston 36, positioned downstream of, i.e. on the leading side of piston stop 28, includes a base 34 that is mounted so that it cannot move, a slidably mounted head 46, a shank 47 formed integrally with said head, and an internal bore 37. Shank 47 is slidably mounted with respect to base 34 as shown. Piston 36 is mounted in bore 40.

The diameter of piston stop shank 32 is less than the diameter of bore 14 and the diameter of piston stop 28 is less than the diameter of chamber 38 so that water flows around said piston stop and through chamber 38 into bore 37 of piston 36 as indicated by the directional arrows collectively denoted 33.

When the system is in substantial repose as depicted in FIG. 1, piston stop 28 is spaced apart a maximum distance from the trailing end of shank 47 of piston 36. Thus, travel of piston head 46 and shank 47 towards piston stop 28 constricts the flow of water from chamber 38 into the hollow bore 37 of piston 36 as depicted in FIG. 2.

Immovably mounted piston base 34 abuts radially inwardly extending annular step 42 at its leading end. Another radially inward step 44 at the leading end of bore 40 limits the forward travel of head 46 of piston 36. Annular gasket 48 seals piston head 46 as shown, and a pair of annular gaskets 50, 52 perform the same function for piston base 34.

Figure 2:
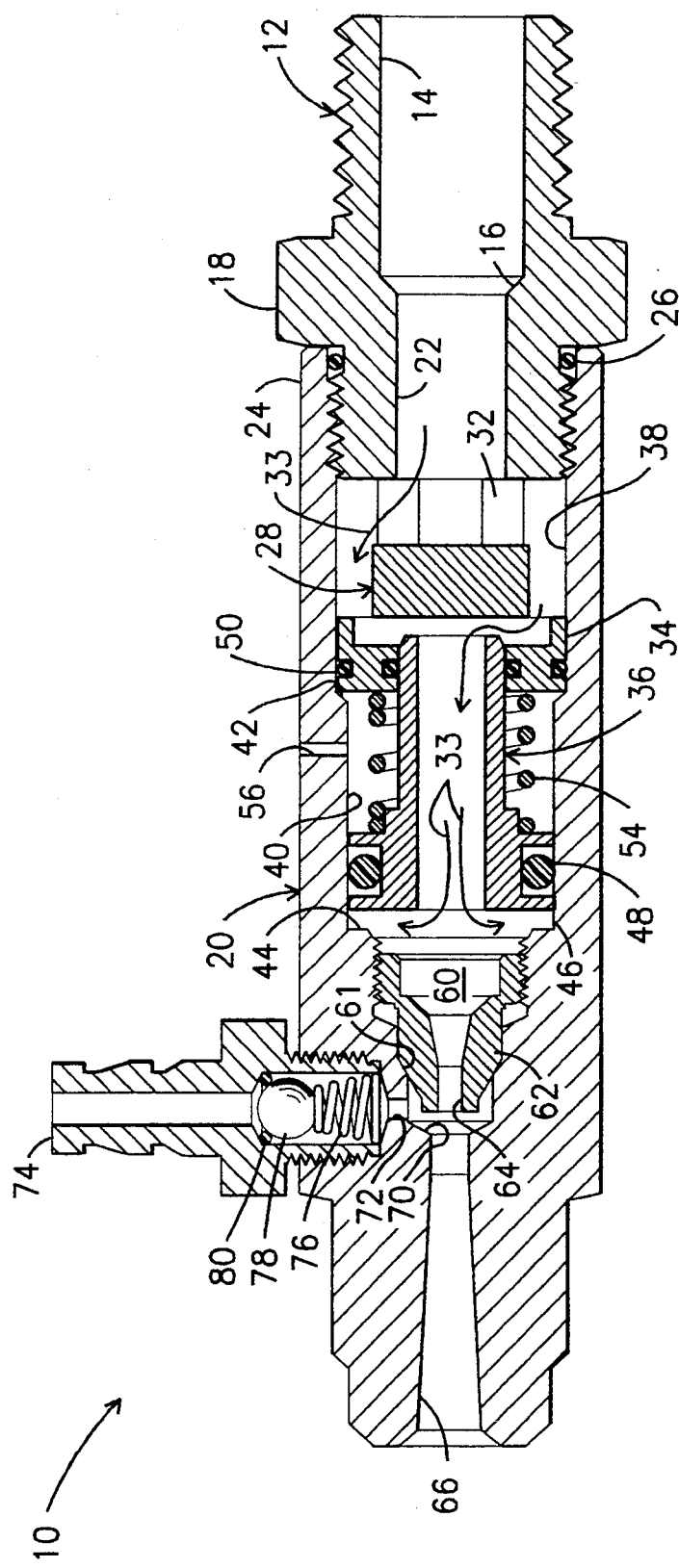
FIG. 2 is a longitudinal sectional view of said embodiment when the size of the variable size pressure chamber has been increased.

Bias means 54 is disposed between head 46 and base 34 of piston 36; it is shown in repose in FIG. 1 and slightly compressed in FIG. 2. Vent 56 provides fluid communication between bore 40 and the ambient environment so that air is not trapped in the space between piston head 46 and piston base 34 when said head is displaced toward said base.

Internal bore 37 of piston 36 is in fluid communication with pressure chamber 60 which is on the upstream or trailing side of orifice member 62. Orifice member 62 has formed therein restriction means 64 which has a predetermined diameter for a preselected flow rate.

Significantly, the longitudinal and radial extent of pressure chamber 60 is greater than the longitudinal and radial extent of restriction means 64. Accordingly, water flowing around piston stop 28 and into bore 37 of piston 36 may enter pressure chamber 60 at a rate faster than it is able to exit said chamber, i.e., the relative sizing of the chamber 60 and restriction means 64 creates a funnel effect at certain flow rates, and pressure will thus build up within said chamber 60. The pressure urges the chamber to expand in volume; since piston 36 is slidably mounted, water pressure bearing against leading end or face 66 of piston 36 causes compression of bias means 54 and displacement of said piston and shank 47 in a direction away from chamber 60, thereby enlarging said chamber and reducing the pressure therewithin. Conversely, when the flow rate of water into novel nozzle 10 decreases, water accumulates in pressure chamber 60 at a slower rate and the pressure in said chamber drops; bias means 54 then urges piston head 46 away from piston stop 28 and thereby reduces the volume of pressure chamber 60 while maintaining a substantially constant pressure therewithin.

Note that the diameter of bore 37 within piston 36 is less than the diameter of piston stop 28. Thus, if piston 36 is driven into abutting contact with said piston stop head, water flow through the novel device is completely cut off. Although such event is not likely to occur, the point to be made is that the liquid flow indicated by directional arrows 33 is increasingly throttled as the pressure on piston head leading surface 66 increases. Similarly, as the back pressure on piston 36 decreases, bias means 54 urges the piston to reduce the size of chamber 60 and to thereby increase the flow rate of water 33 around piston stop 28. The novel structure is thus understood to operate as a servomechanism, i.e., conditions at the output end of the device control conditions at the input end thereof and vice versa. In this manner, the pressure within chamber 60 remains substantially constant, independent of the flow rate of liquid into bore 14.

Restriction means 64 is in fluid communication with venturi chamber 66 and is positioned at the primary (narrowest) side thereof as shown. Specifically, restriction means 64 is positioned in fluid communication with chamber 70. Note that orifice member 62 abuts radially inwardly formed step 61 and is mounted so that it cannot move. Thus, entraining chamber 70 is sealed and cannot change in size. Accordingly, it is maintained at a substantially constant pressure throughout the entire range of incoming water pressure and liquid flowing through it flows at a substantially constant rate.

Valve member 74 is disposed orthogonally with respect to main body 20 of novel nozzle 10. Bore 72, formed in said main body 20, is disposed in radial relation to entraining chamber 70 and is in selective fluid communication therewith. Bias means 76 maintains checkvalve member 78 in a normally closed configuration as depicted, i.e., it urges valve member 78 into seated relation to sealing ring 80.

Figure 3:
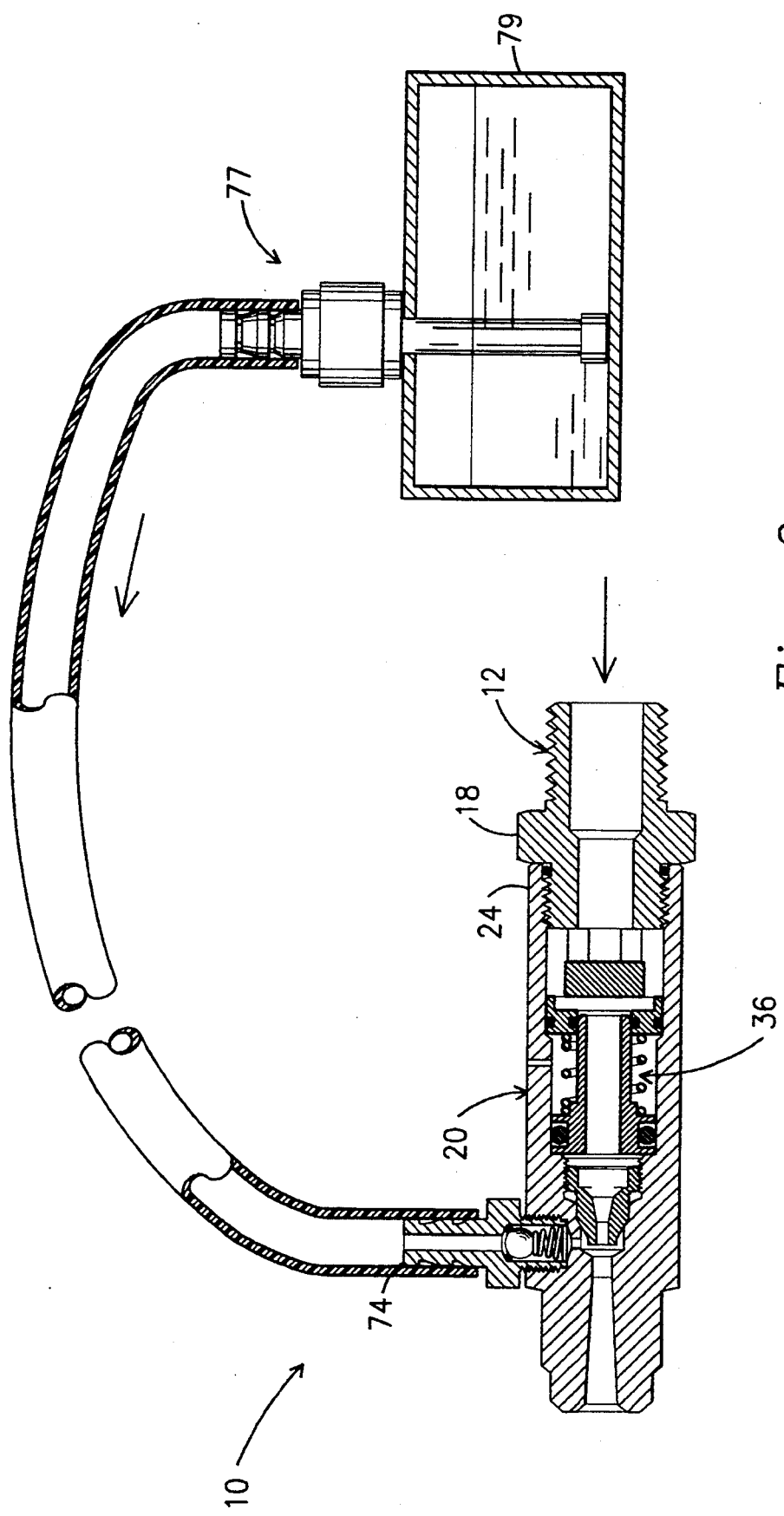
FIG. 3 is a longitudinal sectional view of an alternative embodiment having a remote metering valve.

FIG. 3 depicts an alternative embodiment where a metering means 77 is positioned remote from valve body 10. The inlet of metering means 77 is in fluid communication with a source of liquid chemicals 79 and the outlet thereof is in fluid communication with valve 74. This enables remote adjustable metering of chemicals into the water flow.

Figure 4:
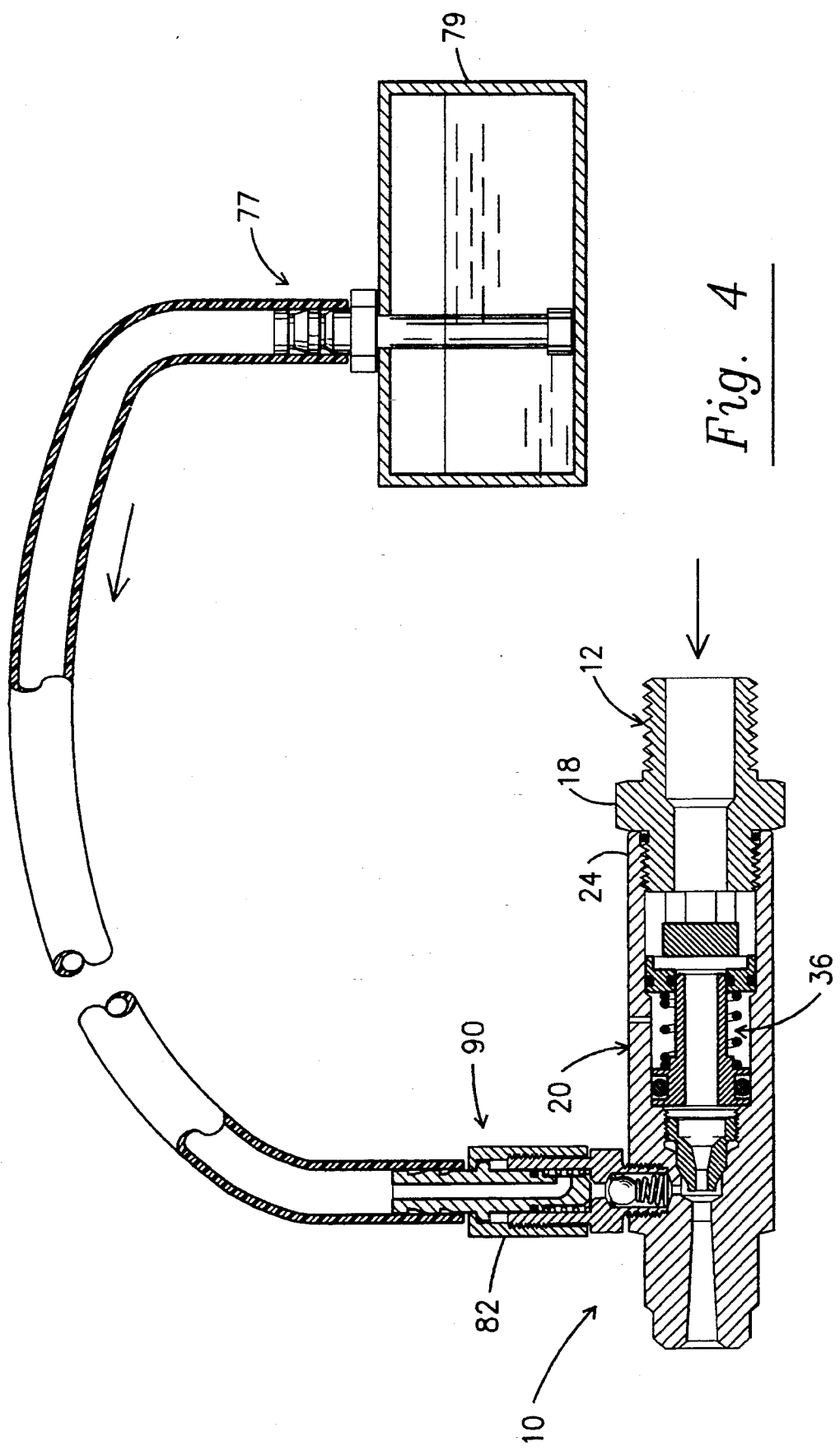
FIG. 4 depicts an embodiment having a metering valve at the nozzle.
Figure 5:
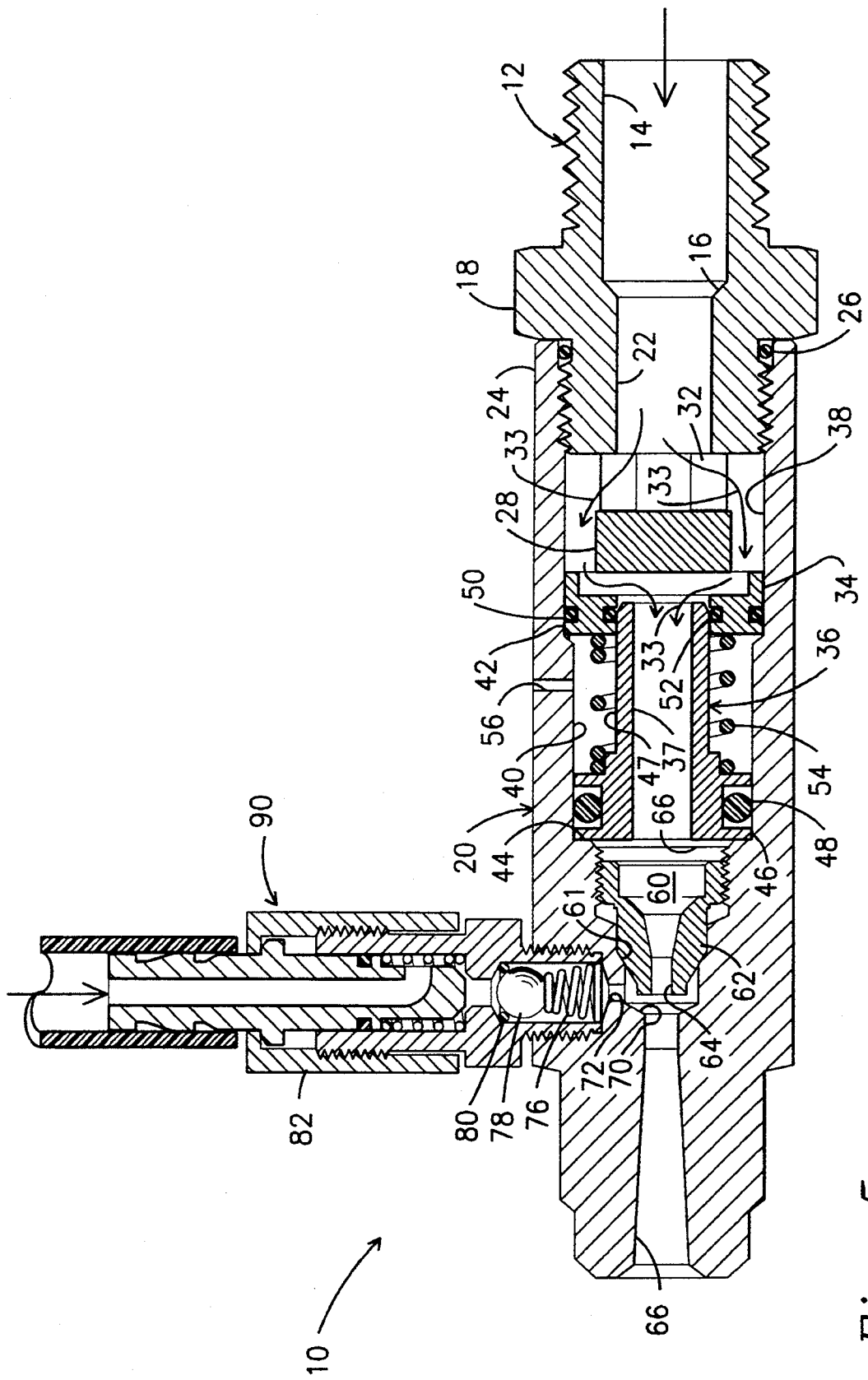
FIG. 5 is a longitudinal sectional view showing the metering valve of FIG. 4 in more detail.

FIG. 4 depicts an alternative embodiment having a commercially available metering valve 90 which includes a rotatable sleeve 82 which changes the bias on bias means 76 when rotated. This enables adjustment of the flow rate of the liquid chemicals entrained into the water flow.

The pressure in entraining chamber 70 as well as the volume and flow rate of water through restriction means 64 is dependent upon the size of restriction means 64. Once the size of restriction means 64 has been determined, the strength of bias means 76 may then be determined because the servomechanism maintains the pressure in entraining chamber 70 at a constant level. Once the amount of vacuum in chamber 70 required to compress bias means 76 by the amount needed to obtain the desired flow rate of liquid chemicals into the water stream is determined, a bias means of the required strength is installed and the system is ready for use.

In a commercial embodiment of the invention, the diameter of restriction means 64 is 4.2 mm, and the strength of checkvalve bias means 76 is 1.1 pounds per inch. As another example, the diameter of the restriction means 64 may be 3.9 mm, and the strength of bias means 76 may be 0.9 pounds per inch.

Similarly, the strength of the piston bias means 54 is also selected dependent upon the size of restriction means 64. Thus, in the first example provided above, the strength of piston bias means 54 is 19.21 pounds per inch, and in the second example, the strength of bias means 54 is 18.66 pounds per inch.

This invention is clearly new and useful. Moreover, it was not obvious to those of ordinary skill in this art at the time it was made, in view of the prior art considered as a whole as required by law.

It will thus be seen that the objects set forth above, and those made apparent from the foregoing description, are efficiently attained and since certain changes may be made in the above construction without departing from the scope of the invention, it is intended that all matters contained in the foregoing construction or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,
What is claimed is:

1. A flow regulating venturi device for introducing liquid chemicals into a water flow, comprising:
    a nozzle having a main body;
    an adaptor for connecting a source of water under pressure to a trailing end of said nozzle main body;
    a venturi chamber formed in a leading end of said nozzle main body;
    an entraining chamber formed in said nozzle main body in fluid communication with said venturi chamber, upstream thereof;
    an orifice member;
    said orifice member having a restriction means formed therein, and said restriction means being in open fluid communication with said entraining chamber;
    a variable size pressure chamber disposed upstream of said orifice member and said variable size pressure chamber being in fluid communication with said restriction means;
    a piston disposed upstream of said variable size pressure chamber and having a leading face in open communication with said variable size pressure chamber;
    said piston having an elongate shank;
    a piston bore having a predetermined diameter being formed in said piston head and said piston shank;
    a bias means for urging said piston and hence said leading face toward said variable size pressure chamber;
    a piston stop positioned upstream of said piston;
    said piston stop disposed in a piston stop chamber and being mounted against movement;
    said piston stop chamber having a breadth greater than a breadth of said piston stop so that water flowing through said nozzle main body may flow around said piston stop;
    said piston shank throttling the flow of water around said piston stop when said piston is displaced toward said piston stop by expansion of said variable size pressure chamber;
    whereby the pressure of water in said entraining chamber remains substantially constant independent of the pressure of water entering said nozzle main body.

2. The venturi device of claim 1, further comprising:
    a valve member disposed in orthogonal relation to said nozzle main body;
    said valve member having an outlet in fluid communication with said entraining chamber and having an inlet in fluid communication with a source of liquid chemicals;
    said valve member including a checkvalve member and a checkvalve member bias means of predetermined strength for positioning said checkvalve member in a normally closed configuration;
    whereby flow of liquid fluid through said entraining chamber creates a venturi effect that overcomes said checkvalve member bias means, unseats said checkvalve member, and entrains liquid chemicals at a substantially constant rate into a stream of water flowing through said nozzle main body.

3. The venturi device of claim 1, further comprising:
    a valve member disposed remote from said nozzle main body in selective fluid communication with said entraining chamber;
    said valve member including an adjustable metering means to vary the flow rate of liquid chemicals entrained into said water flow.

4. A servomechanism, comprising:
    a nozzle main body having a leading end and a trailing end;
    an adaptor means for interconnecting a water-carrying conduit and said trailing end of said nozzle main body;
    a main bore formed in said nozzle main body;
    a piston including a piston head slideably disposed in said main bore and a piston shank formed integrally with said piston head;
    said piston including a piston base that is mounted against movement, said piston base having a central bore formed therein for the slideable reception of said piston shank;
    said piston having a bore of predetermined diameter formed therein to permit flow of water through said piston;
    a piston stop disposed in said main bore of said nozzle main body in spaced relation to a trailing end of said piston shank;
    said piston stop including a head part having a breadth greater than said predetermined diameter of the bore formed in said piston;
    an orifice member disposed in said main bore of said nozzle main body in leading relation to said piston;
    said orifice member defining a restriction means, said restriction means having a predetermined size for a preselected flow rate;
    a chamber being defined between the leading end of said piston and said restriction means;
    said predetermined size of said restriction means being selected to cause water to accumulate in said chamber when water is flowing through said main bore at a predetermined flow rate;
    a bias means of predermined strength for urging said piston away from said piston stop;
    said accumulation of water within said chamber urging said piston to travel toward said piston stop;
    said piston shank increasingly restricting the flow of water through said bore formed in said piston as the volume of water increases in said chamber;
    said bias means responding to fluctuations in pressure in said chamber on a substantially instantaneous basis so that the pressure in said chamber is maintained at a substantially constant predetermined value, said predetermined value being dependent upon said predetermined size of said restriction;
    a venturi chamber formed in said nozzle main body at a leading end thereof;
    an entraining chamber disposed in fluid communication with said venturi chamber at a trailing end thereof;
    said restriction means being in open fluid communication with said entraining chamber;
    a valve member disposed in orthogonal relation to said nozzle main body in selective fluid communication with said entraining chamber;
    said valve member including a checkvalve and a checkvalve bias means of predetermined strength for positioning said checkvalve in a normally closed configuration; and said valve member being in fluid communication with a source of liquid chemicals;

whereby flow of water through said entraining chamber creates a venturi effect that entrains said liquid chemicals into a stream of water flowing through said nozzle main body.

5. The servomechanism of claim 4, wherein said valve member is a metering valve.

6. The servomechanism of claim 4, further comprising:
a remote, adjustable metering means having an inlet in fluid communication with a remote source of liquid chemicals and having an outlet in fluid communication with said valve member.

* * * * *